US009514157B2

(12) United States Patent
Hamburg et al.

(10) Patent No.: US 9,514,157 B2
(45) Date of Patent: Dec. 6, 2016

(54) MULTI-DIMENSIONAL BROWSING OF CONTENT

(75) Inventors: Mark C. Hamburg, Woodinville, WA (US); Eleanor G. Poley, Seattle, WA (US); Eric A. Scouten, Poulsbo, WA (US)

(73) Assignee: Adobe Systems Incorporated, San Jose, CA (US)

( * ) Notice: Subject to any disclaimer, the term of this patent is extended or adjusted under 35 U.S.C. 154(b) by 24 days.

(21) Appl. No.: 13/592,115

(22) Filed: Aug. 22, 2012

(65) Prior Publication Data

US 2014/0059479 A1 Feb. 27, 2014

(51) Int. Cl.
*G06F 17/30* (2006.01)
*G06F 3/0485* (2013.01)

(52) U.S. Cl.
CPC ..... *G06F 17/30274* (2013.01); *G06F 17/3028* (2013.01); *G06F 3/0485* (2013.01)

(58) Field of Classification Search
CPC ............ H04N 1/00196; H04N 1/00453; G06F 17/30274; G06F 17/3028; G06F 3/0485
USPC ........................................................ 715/781
See application file for complete search history.

(56) References Cited

U.S. PATENT DOCUMENTS

| | | |
|---|---|---|
| 5,528,259 A | 6/1996 | Bates et al. |
| 6,181,836 B1 | 1/2001 | Delean |
| 6,512,855 B1 | 1/2003 | Delean |
| 7,031,842 B1 | 4/2006 | Musat et al. |
| 7,065,249 B2 | 6/2006 | Fushiki et al. |
| 7,280,692 B2 | 10/2007 | Fushiki et al. |
| 7,535,473 B2 | 5/2009 | Antoine |
| 7,536,410 B2 | 5/2009 | Wong et al. |
| 7,554,550 B2 | 6/2009 | White et al. |
| 7,707,517 B2 * | 4/2010 | Bier ........................ G06T 11/60 715/700 |
| 7,769,810 B1 | 8/2010 | Kaufman |
| 7,974,486 B2 | 7/2011 | Seely |
| 8,164,599 B1 | 4/2012 | Kadous et al. |
| 8,655,112 B2 | 2/2014 | Bansal et al. |
| 8,983,237 B2 | 3/2015 | Hamburg et al. |
| 9,390,155 B2 | 7/2016 | Otala et al. |
| 2003/0086012 A1 * | 5/2003 | Stavely .............. H04N 1/00384 348/333.05 |
| 2004/0002987 A1 * | 1/2004 | Clancy ............... H04N 5/44543 |
| 2004/0049345 A1 | 3/2004 | McDonough et al. |
| 2004/0167806 A1 * | 8/2004 | Eichhorn ............... G02B 21/26 705/3 |
| 2005/0091596 A1 * | 4/2005 | Anthony ............. G06F 3/04815 715/712 |

(Continued)

OTHER PUBLICATIONS

David Walsh HTML5 Link Prefetching Jul. 7, 2010 18 pages.*

(Continued)

*Primary Examiner* — Andrea Long
(74) *Attorney, Agent, or Firm* — Wolfe-SBMC

(57) ABSTRACT

Multi-dimensional content browsing may include assigning images from a plurality of images into a plurality of groups. An interface that includes first and second dimensions may be displayed. The interface may allow browsing in the first dimension among the plurality of groups and may also allow browsing in the second dimension among one or more images of one of the groups. A request to prefetch image data in at least one of the dimensions may be generated based on an anticipation to display the image data.

20 Claims, 19 Drawing Sheets

(56) References Cited

U.S. PATENT DOCUMENTS

| | | | |
|---|---|---|---|
| 2005/0144221 A1* | 6/2005 | Shin et al. | 709/203 |
| 2006/0080286 A1 | 4/2006 | Svendsen | |
| 2006/0101341 A1* | 5/2006 | Kelly | G06F 17/30899 715/738 |
| 2006/0192881 A1* | 8/2006 | Sato | G06F 3/04817 348/333.05 |
| 2006/0290703 A1 | 12/2006 | White et al. | |
| 2006/0290704 A1 | 12/2006 | White et al. | |
| 2006/0290705 A1 | 12/2006 | White et al. | |
| 2007/0027959 A1* | 2/2007 | Harris | G06F 3/0227 709/217 |
| 2007/0033295 A1* | 2/2007 | Marriott | G06F 8/65 709/248 |
| 2007/0038771 A1 | 2/2007 | Julia et al. | |
| 2007/0118598 A1 | 5/2007 | Bedi et al. | |
| 2007/0217716 A1* | 9/2007 | Marriott | G11B 27/10 382/305 |
| 2009/0063998 A1 | 3/2009 | Huang et al. | |
| 2009/0150791 A1 | 6/2009 | Garcia | |
| 2009/0300642 A1* | 12/2009 | Thaler | G06F 3/0611 718/105 |
| 2010/0100596 A1 | 4/2010 | Strandell et al. | |
| 2010/0169269 A1 | 7/2010 | Chandrasekaran | |
| 2011/0262040 A1 | 10/2011 | Seely | |
| 2011/0299672 A1 | 12/2011 | Chiu et al. | |
| 2012/0005630 A1* | 1/2012 | Ohba | G06F 13/00 715/853 |
| 2013/0067349 A1* | 3/2013 | Glaza | G06F 17/30899 715/747 |
| 2014/0050419 A1 | 2/2014 | Lerios et al. | |
| 2014/0055474 A1 | 2/2014 | Otala | |
| 2014/0056530 A1 | 2/2014 | Otala | |
| 2014/0056540 A1 | 2/2014 | Hamburg | |
| 2015/0186021 A1 | 7/2015 | Hamburt et al. | |

OTHER PUBLICATIONS

"Photoshop.com," Adobe Systems Incorporated 2012, downloaded from http://www.photoshop.com/ on Mar. 21, 2012, 3 pages.
"Picasa Web Albums," Google 2011, downloaded from http://picasaweb.google.com on Mar. 21, 2012, 1 page.
"Picasa and Picasa Web Albums," Google 2012, downloaded from http://support.google.com/picasa/bin/answer.py?hl=en&answer=157000 on Mar. 21, 2012, 2 pages.
"Welcome to Flickr—Photo Sharing," flickr from Yahoo, Yahoo! Inc. 2012, downloaded from www.flickr.com on Mar. 21, 2012, 7 pages.
"Flickr: Tour," flickr from Yahoo, Yahoo! Inc. 2012, downloaded from http://www.flickr.com/tour/#section=welcome on Mar. 21, 2012, 1 page.
"Image hosting, free photo sharing a& video sharing at Photobucket," Photobucket Corporation 2012, downloaded from www.photobucket.com on Mar. 21, 2012, 2 pages.
"Photo Sharing. Your Photos Look Better Here," SmugMug 2012, downloaded from www.smugmug.com on Mar. 21, 2012, 3 pages.
"Welcome to Facebook: Facebook helps you connect and share with the people in your life," Facebook 2012, downloaded from www.facebook.com on Mar. 21, 2012, 1 pages.
"Google+: real life sharing, rethought for the web," Google 2012, downloaded from http://plus.google.com on Mar. 21, 2012, 1 page.
"Dropbox-Simplify your life," downloaded from www.dropbox.com on Mar. 21, 2012, 1 page.
"Remember everything with Evernote, Skitch and our other great app," Evernote Corp. 2012, downloaded from www.evernote.com on Mar. 21, 2012, 2 pages.
Goodsync: File Synchronization Software, File Backup, File Sync, Siber Systems, Inc. 2010-2012, downlaoded from www.goodsync.com on Mar. 21, 2012, 3 pages.
"Non-Final Office Action", U.S. Appl. No. 13/592,108, Jul. 17, 2014, 11 pages.
"Non-Final Office Action", U.S. Appl. No. 13/591,882, Oct. 8, 2014, 15 pages.
"Non-Final Office Action", U.S. Appl. No. 13/592,105, Oct. 6, 2014, 15 pages.
"Notice of Allowance", U.S. Appl. No. 13/592,108, Nov. 4, 2014, 6 pages.
"Corrected Notice of Allowance", U.S. Appl. No. 13/592,108, Feb. 12, 2015, 2 pages.
"Final Office Action", U.S. Appl. No. 13/591,882, Mar. 26, 2015, 18 pages.
"Final Office Action", U.S. Appl. No. 13/592,105, Mar. 27, 2015, 19 pages.
"Non-Final Office Action", U.S. Appl. No. 13/592,105, Jul. 31, 2015, 14 pages.
"Non-Final Office Action", U.S. Appl. No. 13/591,882, Aug. 3, 2015, 20 pages.
"Notice of Allowance", U.S. Appl. No. 13/592,105, Mar. 11, 2016, 10 pages.

* cited by examiner

MULTI-DIMENSIONAL BROWSING OF CONTENT

BACKGROUND

Digital cameras are now available in many devices (e.g., cell phones, tablet devices, etc.) beyond dedicated point and shoot or DSLR purpose-built devices. This is has led to photographs being stored on multiple devices and/or computers as well as various network services. Moving all of one's photographs to a centrally managed repository is often impractical because of the effort involved, especially with large collections. Moreover, many people do not want to move assets away from an existing collection or service because friends and family are accustomed to viewing them on a particular service. Consolidation, management, and a consolidated view of a user's photos across devices and platforms are not available with current solutions.

SUMMARY

This disclosure describes techniques and structures for multi-dimensional content browsing. In one embodiment, images from a plurality of images may be assigned into a plurality of groups. Each group may include at least one of the images. An interface that includes first and second dimensions may be displayed. The interface may allow browsing in the first dimension among the plurality of groups and may also allow browsing in the second dimension among one or more images of one of the groups. A request to prefetch image data in at least one of the dimensions may be generated based on an anticipation to display the image data. Requests to prefetch the image data may be canceled based on a determination that prefetching the image data has not been initiated and that displaying the image data is no longer anticipated.

Figure 1:
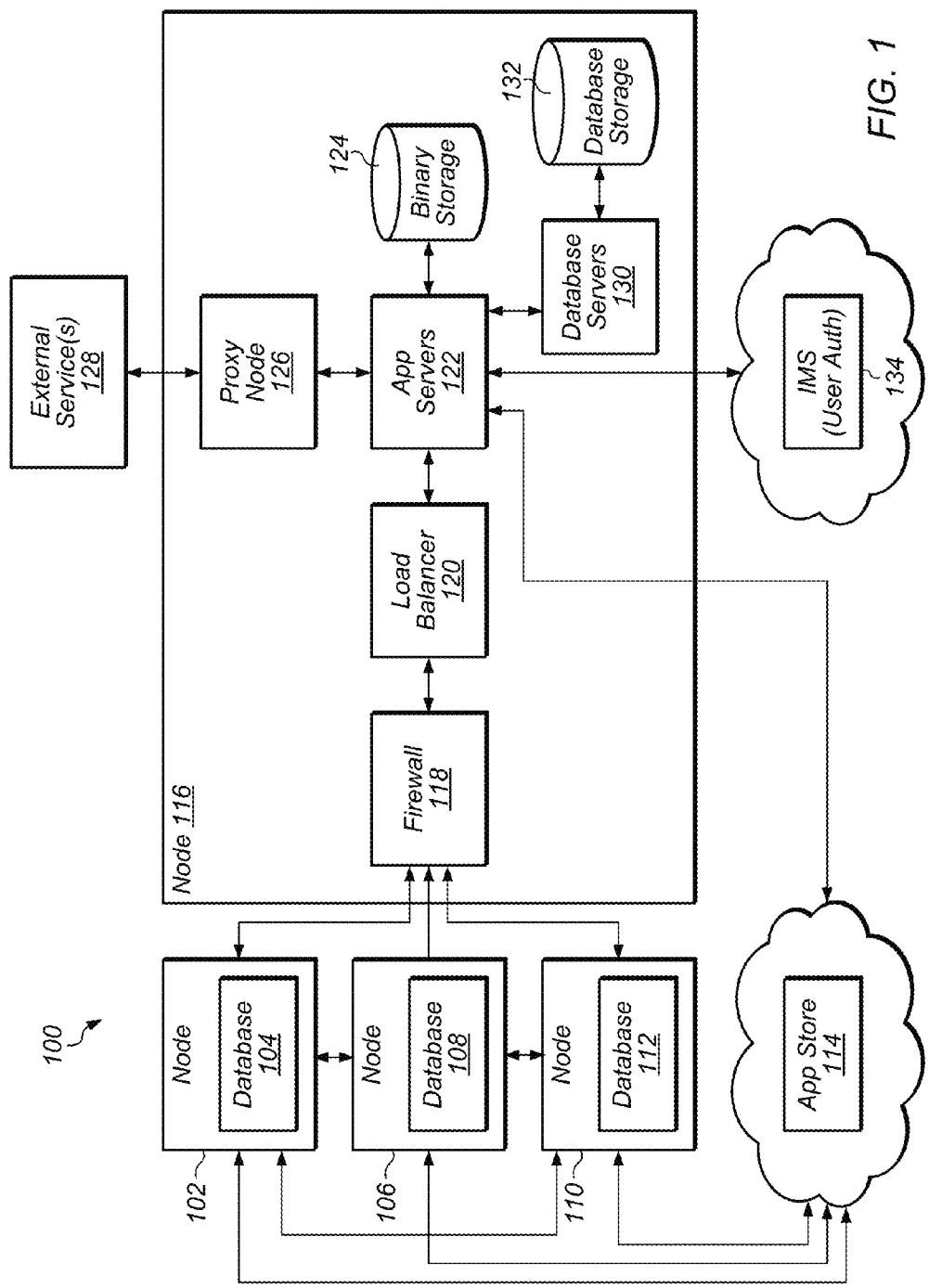
FIG. 1 is a block diagram that illustrates an example content collaboration system, according to some embodiments.

While the disclosure is described herein by way of example for several embodiments and illustrative drawings, those skilled in the art will recognize that the disclosure is not limited to the embodiments or drawings described. It should be understood, that the drawings and detailed description thereto are not intended to limit the embodiments to the particular form disclosed, but on the contrary, the intention is to cover all modifications, equivalents and alternatives falling within the spirit and scope of the present disclosure. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

"First," "Second," etc. As used herein, these terms are used as labels for nouns that they precede, and do not imply any type of ordering (e.g., spatial, temporal, logical, etc.). For example, in a content-aware mesh that includes multiple nodes, the terms "first" and "second" nodes can be used to refer to any two of the multiple nodes. In other words, the "first" and "second" nodes are not limited to logical nodes 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Various embodiments for accessing and/or manipulating content in a content-aware mesh are described. This specification first describes a mesh of collaborating nodes (e.g., computing devices, such as tablet devices, cell phones, computers, etc.) that each may participate in the creation and management of a catalog that spans assets distributed on the various nodes. The specification then describes non-destructive editing techniques and techniques for browsing content. Various examples and applications are also disclosed. Some of the techniques may, in some embodiments, be implemented by program instructions stored in a computer-readable storage medium and executable by one or more processors (e.g., one or more CPUs or GPUs) of a computing apparatus. The computer-readable storage medium may store program instructions executable by the one or more processors to cause the computing apparatus to perform the various techniques, as described herein. Other embodiments may be at least partially implemented by hardware circuitry and/or firmware stored, for example, in a non-volatile memory.

Turning now to the figures, FIG. 1 is a block diagram that illustrates an example content collaboration system, according to some embodiments of the present disclosure. In the illustrated embodiment, system 100 includes nodes 102, 106, 110, and 116. Note that in other embodiments, system 100 may include other numbers of nodes. Nodes may also be referred to herein as computing device, clients, and/or peers. In some embodiments, node 116 may be referred to as a coordinating node. Each of nodes 102, 106, and 110 may be coupled to one another via a network (not shown). The network may include any channel for providing effective communication between each of the entities of system 100. In some embodiments, the network may include an electronic communication network, such as the internet, a local area network (LAN), wireless LAN (WLAN), WiMAX network, cellular communications network, or the like. For example, the network may include an internet network used to facilitate communication between each of the entities of system 100. As shown in FIG. 1, node 116 may also be communicatively coupled to information management system ("IMS") 134, application store 114, and external services 128. Application store 114 may also be communicatively coupled to each of nodes 102, 106, and 110.

System 100 may be referred to as a content-aware mesh in that the relationship among components of the mesh may not be in a typical client-server arrangement. Instead, the various components may be peers in the mesh. In other embodiments, node 116 may operate as a server with client nodes 102, 106, and 110. Further, in some embodiments (e.g., for multi-dimensional browsing), the structure of the system may be any type of system, even a single node system.

Content aware refers to the system's expectation of handling certain types of content (e.g., images, video, etc.). Certain optimizations, as described herein, may result from the system being content aware. In the content-aware mesh, there may be more than one home for the content. The mesh may collect and/or connect the content (e.g., images) from the plurality of nodes so that a user of the mesh has a single view into all of the content from anywhere (e.g., connected to the internet or offline, on any capable device).

Although the illustrated system includes four nodes (102, 106, 110, and 116), other examples include two nodes, three nodes, five nodes, or any other number of nodes. Example nodes may include a number of devices, such as tablet devices, cellular phones, set-top boxes, televisions, cameras, printers, computers, among others. For example, a person using the content-aware mesh may have a cellular phone, tablet device, and a laptop as three nodes that may connect to node 116 and/or external services 128 via the content-aware mesh. Each node may include various components (e.g., processor(s), program instructions, I/O interface, etc.) that are not illustrated in FIG. 1, such as the components shown in FIG. 10. Each node may be configured to implement a user interface such that a user may view, edit, or otherwise manipulate content that is distributed among the various nodes. Example user interfaces are shown in FIGS. 7A-7E, 8A-8C, and 9A-9H.

The nodes may be rich clients. For example, nodes 102, 106, and 110 may each include a database, shown as databases 104, 108, and 112, respectively. Databases 104, 108, and 112 may be databases that are configured to maintain a mapping of content (e.g., images) stored on the various nodes. As one example, node 102 may include memory (not shown) that stores photos A1-A5, node 106 may include memory (not shown) that stores photos B1-B5, and node 110 may include memory (not shown) that stores photos C1-C5. Databases 104, 108, and 112 may each be configured to include a mapping of the full set of photos (e.g., photos A1-A5, B1-B5, and C1-C5). The mapping may include file name identifiers (e.g., A1) and other information, such as file location (e.g., node 106), size, file type, timestamp, associated renditions and/or revisions, etc. The mapping may be structured as a database (as shown), or as another type of data store. The databases 104, 108, and 112 may be updated periodically or may be updated upon occurrence of an event (e.g., new photos added to the collection, photos removed from the collection, edits to any of the photos, addition or deletion of a node, addition or deletion of an authorized user, etc.).

Node 116 may be a coordinating node. In some embodiments, node 116 may be a cloud-based web service. As shown, other nodes may access node 116 via firewall 118. Node 116 may include a number of application servers 122, which may be load balanced by load balancer 120. Application servers 122 may be elastic compute cloud ("EC2") servers. Applications servers 122 may be coupled to load balancer 120, application store 114, IMS 134, external services 128 via proxy node 126, database servers 130, and binary storage 124. Database servers 130 may likewise be EC2 servers and may be coupled to database storage 132. Binary storage 124 may be reduced redundancy storage ("RRS") and database storage may be elastic block storage ("EBS").

As with the mapping that may be stored by nodes 102, 106, and 110, node 116 may be configured to store a similar mapping of content. For example, node 116 may be configured to store, in binary storage 124 and/or database storage 132, a mapping of content including identifiers, location of content, size, etc. Node 116 may also be configured to store at least some of the content. In some embodiments, node 116 may further be configured to store various renditions created by the various nodes. As used herein, a rendition may include a low-resolution (e.g., less than full resolution, half the resolution as the original, etc.) version of the original image and/or a thumbnail of that version. The rendition may be based on one or more edits/changes/modifications to the original image. The renditions may be stored without replacing the original image. In doing so, editing images may be non-destructive such that the original content is maintained. Databases 104, 108, and 112 may be synchronized to the corresponding database of node 116 to maintain a synchronous mapping.

The load balanced servers of node 116 may operate as a single unit to perform the following services to any peer node: store a user's authentication information and ensure that access to the user's resources is restricted to only those who possess the necessary credentials, store the user's subscription information and automatically bill the user for the service (e.g., yearly, monthly, etc.), store a copy of each user's account state: catalogs of images, assets within each catalog, and revisions and renditions within those assets, provide powerful query capabilities to enable other mesh nodes to retrieve that information while consuming minimal network resources, and provide additional digital imaging services such as format conversion, scaling, rendering, and so on, such that other nodes lacking those capabilities can still effectively insert into and interact with the content stored in the mesh. Although node 116 may include additional capabilities over other nodes of the mesh, in some embodiments, it may not be a central repository of all the mesh's information. Note that the disclosed non-destructive editing and browsing techniques may be implemented where a single node does serve as a central repository.

External service(s) 128, also referred to as a non-collaborating node(s), may include various third-party services that may be used to store content. For instance, external services may include Facebook, Flickr, Google+, among others. In each of those examples, a user may maintain content albums (e.g., images, video, etc.) on the external service. Application servers 122 may access the content stored on, or by, external services 128 via proxy node 126. Accordingly, as an example, a user of node 102 may access images on external services 128 via proxy node 126 of node 116, manipulate those images, and update the images based on the manipulations. Note that such manipulations may be non-destructive, as described herein. Node 116 may have knowledge of the application programming interfaces (APIs) provided by external services 128. The mesh may have access to external services 128 via proxy node 126 by maintaining log-in information and synchronizing to the account in a manner that is transparent to a user of the mesh. The various nodes of the mesh may update content on external services 128 and vice versa. From a developer's standpoint, the developer may not need to know details of the external service's API as that interaction is abstracted by node 116 and handled server-to-server for increased performance. In addition, that layer of abstraction may shield the other mesh nodes from incompatible changes to those external service APIs.

Proxy node 126 may provide a view into the content stored by external service(s) 128 and allow for access and management of that content. In one embodiment, assets may not be moved away from the originating service but instead, an access token may be maintained. The assets may be referenced within the rest of the content shared amongst the collaborating nodes of the mesh. This may allow a comprehensive view of the user's entire asset collection regardless of which service actually stores the assets and without having to move them or disrupt their existing use of those services. Although proxy node is illustrated within node 116, it may reside elsewhere in other embodiments.

IMS 134 may provide a mechanism to authenticate a user of a node to access content of the content-aware mesh. For example, users of node 102, 106, and 110 may be family members who have been approved to access to the content (e.g., by an owner of the collection, e.g., the user of node 102). Each user may be prompted to log in prior to accessing the content. A request to access content, from a node, may pass through node 116 to IMS 134 or may go straight to IMS 134. IMS 134 may be configured to grant or deny access to the distributed content based on a user's credentials. Note that a user of a node, for example node 102, may access locally stored content on that node even when not granted access to the content distributed on various nodes.

Application store 114 may include a number of applications that may be used to access the content-aware mesh. For example, a user of a node may purchase an application from application store 114. The application may be executed on one of the nodes such that the node may access the distributed content of the content-aware mesh. Purchase may be a one-time event or may be a subscription (e.g., daily, weekly, monthly, yearly, etc.). Any subscription may also play a role in authentication by IMS 134. For example, a node may be running an appropriate application to access the content but without a valid subscription. Upon attempting to access the content, IMS 134 may deny the node's access without a valid subscription.

Figure 2:
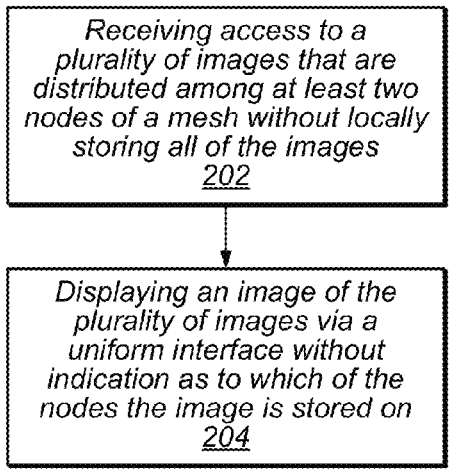
FIG. 2 is a flowchart that illustrates a method for accessing content in a content collaboration system, according to some embodiments.

Turning now to FIG. 2, one embodiment of accessing content of a collaborative content sharing system is illustrated. While the blocks are shown in a particular order for ease of understanding, other orders may be used. In some embodiments, the method of FIG. 2 may include additional (or fewer) blocks than shown. Blocks 202-204 may be performed automatically or may receive user input. The method of FIG. 2 may be performed, in some embodiments, by a node (e.g., node 102 of FIG. 1).

As illustrated at 202, access may be received to a plurality of images that are distributed among at least two nodes of a content-aware mesh. In one embodiment, the two nodes are not part of a same service. For example, if a single node is made up of multiple servers of the same service (e.g., a user's Flickr account), the multiple servers may not be counted as separate nodes; instead, the multiple servers of the same service may collectively be considered as a single node. Accordingly, if a user of Flickr, as part of a Flickr photo album, has images stored on several Flickr-controlled servers, those images are considered to be stored on a single node. Examples of nodes that may be included as one of the nodes may be nodes 102, 106, 110, and/or 116, and/or proxy node 126 that corresponds to external service 128 (the proxy node may represent the Flickr servers in the above example as a single node). In a simple example, the at least two nodes may be node 102 and node 116. In such an example, the images may be distributed between nodes 102 and 116. In other examples, a user may have a variety of devices (e.g., tablet, phone, computer), each representing a node. Or, a family of users may be linked to the mesh such that user A has a device (node 102), user B has a device (node 106), and user C has a device (node 110), with each device coupled to each other device and to device 116.

An example image collection may include 25,000 images. 20,000 may be stored at node 102 and 5000 may be stored at node 116. In one embodiment, node 102 may be a user device, such as a tablet device, while node 116 may be reside on a cloud service. Access to the images may be received by a node without locally storing all of the images. Thus, in the 25,000 image collection example above, node 102 may have access to all 25,000 images without locally storing all 25,000. Thus, access to the 5000 that are stored remotely from node 102 may be received by node 102. Access may include the ability to edit images, including non-destructive editing as described herein. In some embodiments, node 102 may receive and locally store, at least temporarily, an image that is being edited. In other embodiments, editing may be performed by node 102 without having a local copy of the original image stored locally.

In some embodiments, receiving access may be via a coordinating node of the mesh. For example, node 116 of FIG. 1 may be a coordinating node of mesh 100. As described herein, the coordinating node may include a plurality of load balanced servers. Receiving access may include requesting access, and receiving authorization from IMS 134. In other embodiments, nodes may directly access content from other nodes without going through a coordinating node. In those embodiments, a similar authentication may take place or the nodes may be initially configured as trusted nodes (e.g., on a home network, by MAC address, etc.).

At 204, an image of the plurality of images may be displayed. Display of the image may be performed via a uniform interface without indication as to which of the at least two nodes the image is stored on. Accordingly, the source of the image (e.g., external service(s) 128, node 110, etc.) may be transparent to a user of the uniform interface such that the full collection of images may appear to be collocated even though they are distributed among the nodes. Note that the uniform interface may display more than a single image at a time. See FIG. 7F for an example of a single image displayed without indication as to which node the image is stored on and FIG. 7E for a multiple image display example.

Displaying of an image or images on an interface of a node may be performed in an offline mode (e.g., when the node is not connected to the mesh). For example, any images that are currently being edited by the node may be locally stored on the node. Or, a user of the node may initiate an offline preparation technique that allows some content to be downloaded from the various nodes to a node in anticipation of an offline period (e.g., a flight without Wi-Fi access, etc.). Upon reconnecting to the mesh, the node may automatically synchronize the plurality images to the mesh. For example, synchronizing may include uploading textual information describing edits to content. Synchronization may take place via a cloud service (e.g., node 116) or may be performed directly between peer nodes (e.g., node 106, node 110, proxy node 126, etc.). In one embodiment, automatically synchronizing may include the node notifying other nodes of the mesh of any changes the node made to the plurality of images. Automatically synchronizing may also include receiving an update to any of the plurality of images that changed (e.g., by other nodes) during the time the node was not connected to the mesh. Note that synchronization also occur at other times, such as periodically (e.g., daily, hourly, etc.) or upon an event (e.g., a node's initial connection to the mesh, submitting edit information, etc.), and is not limited to a node reconnecting to the mesh.

In some embodiments, information regarding each of the plurality of images may be stored in a database of the node receiving access at 202. As described herein, the database may be a mapping that includes a variety of information, such as an identifier and a location pointer for each image. The database of a given node may be synchronized to the mesh. For instance, each node may include a database that is synchronized to the other databases such that each node has a complete view of available content. The database may also be synchronized to a master copy of the mapping. In one embodiment, each node's database may be synchronized to the database of a coordinating node. As such, the coordinating node may be configured to store information regarding each of the images.

In various embodiments, edits may be received to an image via the uniform interface. The image may be stored remotely at another node and a lower-resolution copy of the image may be available locally at the node that is performing the edits. Or, a local copy of the original image may be used to perform the edits. In any event, textual data corresponding to the edits may be transmitted to the other node that is storing the image. The other node may be configured to apply the textual data to the image resulting in an updated version of the image. Note that the updated version may not replace the original but instead may be another version. The textual data may be transmitted directly to the other node or it may be performed via the coordinating node of the mesh. For example, the coordinating node may pass the textual data to external services via a proxy node. In embodiments where the coordinating node provides the textual data to another node, it may first store the textual data in its database.

Transmission of data may be highly selective. Because each node of the mesh may maintain a synchronized database and is aware of the mesh's contents, the node may selectively request just the asset components (e.g., revisions, renditions, etc.) that it wants to display a catalog. For example, a user of node 102 may wish to edit an image on node 106. Node 102 may download the original version of the image from node 106 to edit the image. Other images that the user of node 102 only wishes to view may not be downloaded locally to node 102. Or, a user of node 102 may wish to view a series of edits made by other nodes to images stored locally on node 102. Node 102 may only download the revisions and apply them locally, or may download the low-resolution renditions. Either way, network resources may be conserved as opposed to a node downloading many full-resolution images or the entire collection of images.

In one embodiment, an interface may allow the node implementing the method of FIG. 2 to invite other nodes to join the mesh. Those other nodes may represent other devices of the user of the node or other users. This may allow the other devices and/or other users to access and edit the content.

Figure 3:
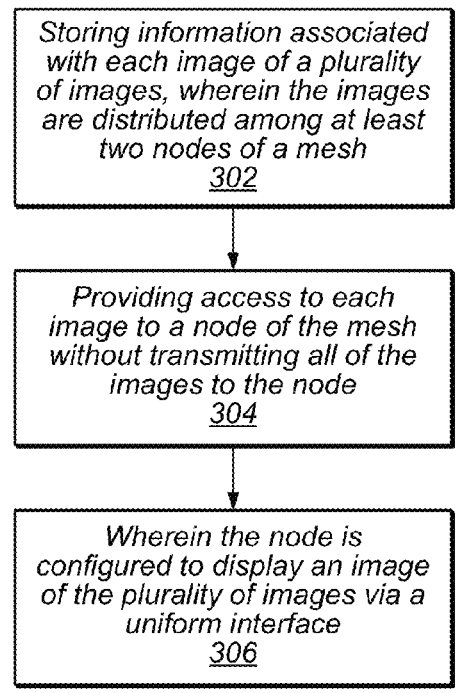
FIG. 3 is a flowchart that illustrates a method for a node facilitating content sharing in a collaborative content sharing system, according to some embodiments.

Turning now to FIG. 3, one embodiment for facilitating content sharing in a collaborative content sharing system is illustrated. While the blocks are shown in a particular order for ease of understanding, other orders may be used. In some embodiments, the method of FIG. 3 may include additional (or fewer) blocks than shown. Blocks 302-306 may be performed automatically or may receive user input. The method of FIG. 3 may be performed, in some embodiments, by a node (e.g., a coordinating node, such as node 116 of FIG. 1).

As illustrated at 302, information associated with each image of a plurality of images may be stored by the coordinating node, which, as described herein, may be a cloud-based plurality of load balanced servers. As described at 202, the images may be distributed among at least two nodes, which are not part of a same service, of a content-aware mesh. As described herein, information may include file name identifiers (e.g., A1) and other information, such as file location (e.g., node 106), size, file type, timestamp, associated renditions and/or revisions, etc.

The coordinating node may also store authentication information. Providing access to the images to various nodes may be based on the stored authentication information. Authentication information may include MAC addresses, stored usernames and/or passwords, subscription information, access tokens, encryption certificates, etc. Each node of the mesh may have a corresponding set of authentication information that is stored at the coordinating node. In one embodiment, access may be limited to nodes that the coordinating node authenticates.

At 304, access to each image may be provided to a node of the mesh. In one embodiment, access may be provided by the coordinating node. Providing access may be performed without the coordinating node transmitting all of the images to the node. For example, the node may have access to images that are stored on other nodes, without locally storing all of those images. In some embodiments, the coordinating node may be configured to provide access to each image to another node of the mesh. The coordinating node may receive a request by that other node to access the images. Such a request may be in the form of the other node providing log-in credentials or may take place automatically upon the other node connecting to the mesh. If the other node is authorized, the coordinating node may provide access to the images. Providing access may be performed without transmitting all of the images to the other node.

As shown at 306, the node may be configured to display an image of the plurality of images via a uniform interface without indication as to which of the nodes the image is stored on. The uniform interface may be the interface described at block 204 of FIG. 2. Example interfaces are shown in FIGS. 7A-7E, 8A-8C, and 9A-9H.

In one embodiment, the node may be configured to edit the images. As part of editing the images, the node may be configured to generate textual data describing an update to the image (e.g., an image that is stored remotely, or one that is stored locally). The coordinating node may receive the textual data from the node without receiving the original image being edited. The coordinating node may then store the textual data. In one embodiment, for example, if the original image being edited is stored remotely from the node and coordinating node, the coordinating node may provide the textual data to the node storing the original image. The node that stores the original image may be configured to generate an updated version of the image (e.g., a less than full resolution version).

In one embodiment, the coordinating node may update the stored information associated with an image. Updating the stored information may include adding a new set of textual data representing edits to an image. For instance, textual data corresponding to a previous edit may have already existed in the database. The next textual data may be merged with the currently received textual data to form a list of edits. Such edits may both refer to the original version of the image or the later received edits may build upon a previously made edit. Edits may be non-destructive in that making an edit and storing the corresponding textual data may not overwrite the original image or previous edits. Note that outside the editing context, an original image and/or previous edits may be replaced or deleted if explicit instructions to do so are received.

In one embodiment, the coordinating node may receive a request from the node to perform image processing on one or more of the images and the coordinating node may perform such image processing. Image processing may include applying the textual data to the original image to generate a modified version of the image without replacing the original image. The modified version may be a low-resolution preview. Image processing may also include generating a thumbnail of the modified image. In other embodiments, the node may be configured to generate the textual data, preview, and/or thumbnail and provide each to the coordinating node. The coordinating node may receive the textual data, preview, and/or thumbnail and store each of them. Or, as described herein, the coordinating node may serve as a conduit to provide the textual data to the node storing the original image.

In one embodiment, a proxy node may be created by the coordinating node to connect the mesh to a non-collaborating node, or external service (e.g., Flickr, Google+, etc.). A token may be maintained by the coordinating node that allows nodes of the mesh to access images stored by the external service. Such access may allow a user to transparently access those images.

The content-aware mesh of FIGS. 1-3 may provide a number of benefits. As one example, four users may wish to share content among each other and each user may wish to access the content from a number of their own devices (e.g., tablet device, computer). Thus, the mesh supports a multi-user, multi-device configuration. User A may refuse to use any service other than flickr, user B may prefer to use a different service, user C may spread images on a variety of services, and user D may also spread images on a variety of services and store other images locally on multiple devices. The content-aware mesh may provide full access to the content in a seamless interface such that it is transparent to Users A-D of where the actual content is stored. The content-aware mesh of FIGS. 1-3 may also allow users to operate in an off-line manner. Further, network traffic may be minimized by allowing selective transmission of data (e.g., only transmitting textual data describing changes instead of full-resolution modified images).

Figure 4:
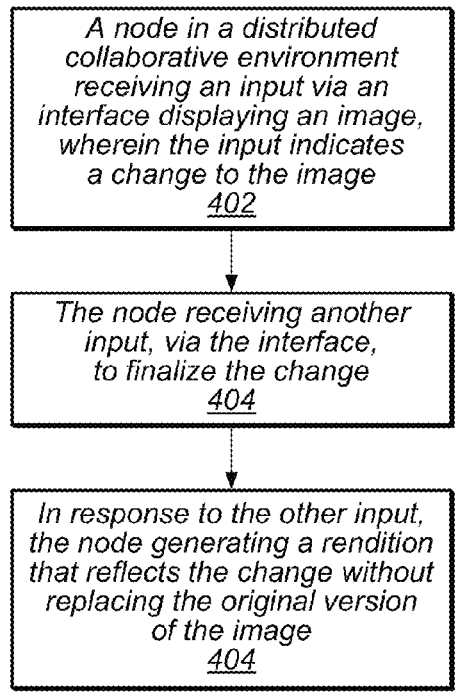
FIGS. 4-5 are flowcharts that illustrate non-destructive content editing, according to some embodiments.

Turning now to FIG. 4, one embodiment of non-destructive content editing is illustrated. While the blocks are shown in a particular order for ease of understanding, other orders may be used. In some embodiments, the method of FIG. 4 may include additional (or fewer) blocks than shown. Blocks 402-404 may be performed automatically or may receive user input. The method of FIG. 4 may be used in conjunction with the methods of FIGS. 2, 3, 5, and/or 6. Accordingly, a combination of some or all of the blocks of FIGS. 2, 3, 5, and/or 6 may be used in some embodiments. In one embodiment, a node, such as node 102, may perform the method of FIG. 4.

As illustrated at 402, an input may be received via an interface displaying an image of a plurality of images. The input may be received by a node among a plurality of nodes in a distributed collaborative environment. The input may indicate a change regarding the image. The change may affect the visual appearance of the image. Changes may include adding a tag to an image (e.g., outdoor scene, beach, etc.) and/or may include substantive edits, such as contrast, white balance, exposure, etc.

Figure 7A:
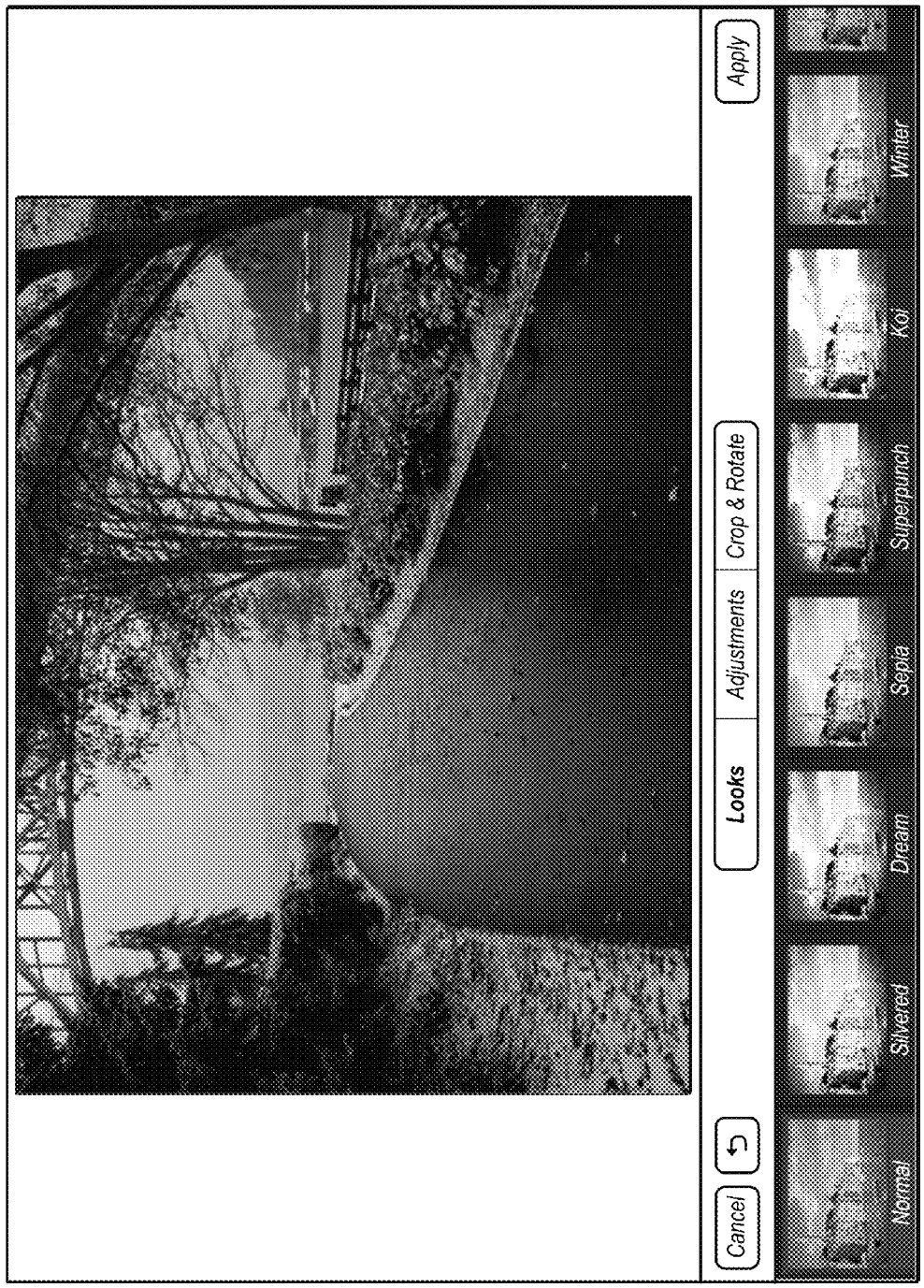
FIGS. 7A-7E illustrate examples of an interface that is usable to perform non-destructive content editing, according to some embodiments.
Figure 7B:
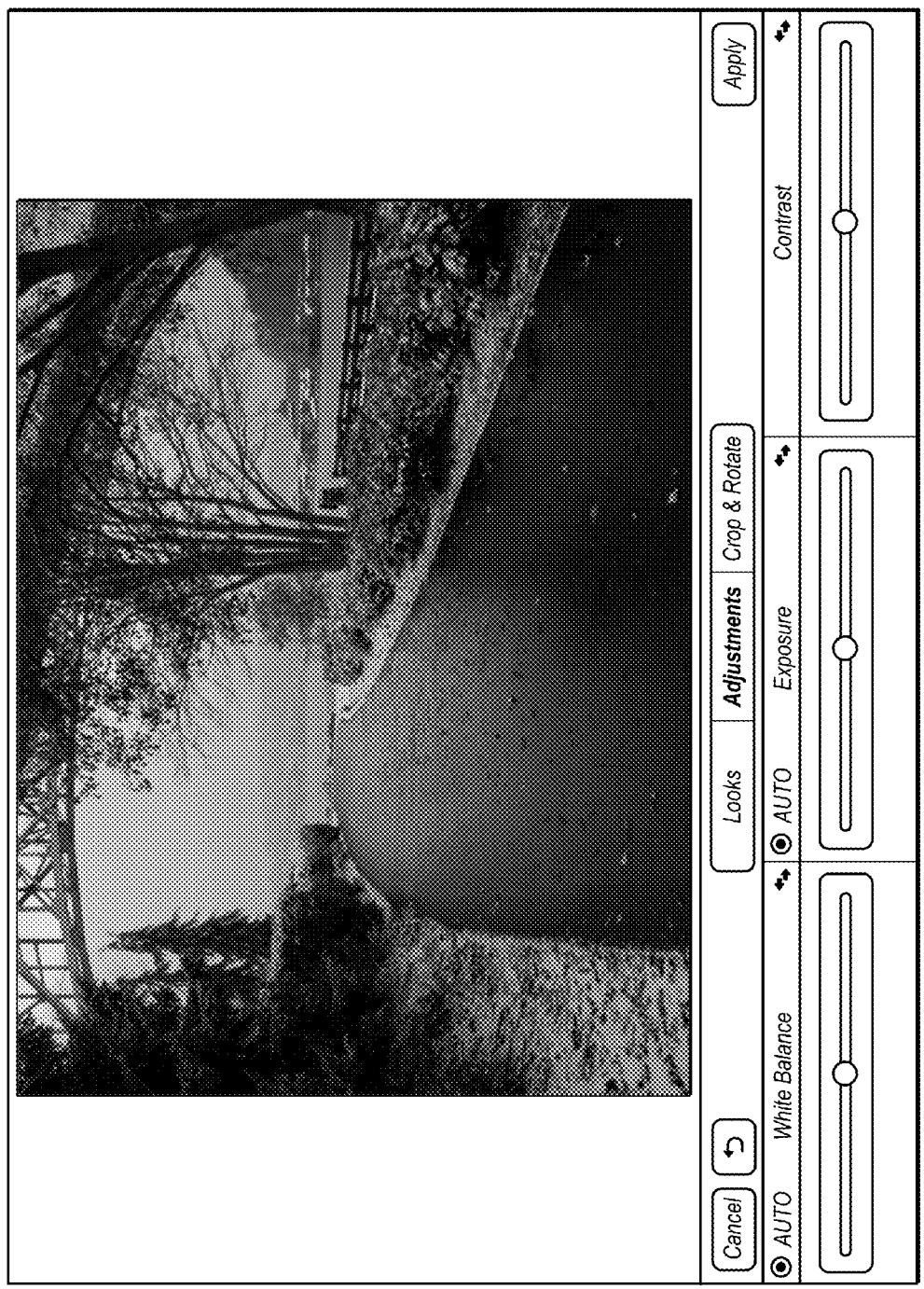
Figure 7C:
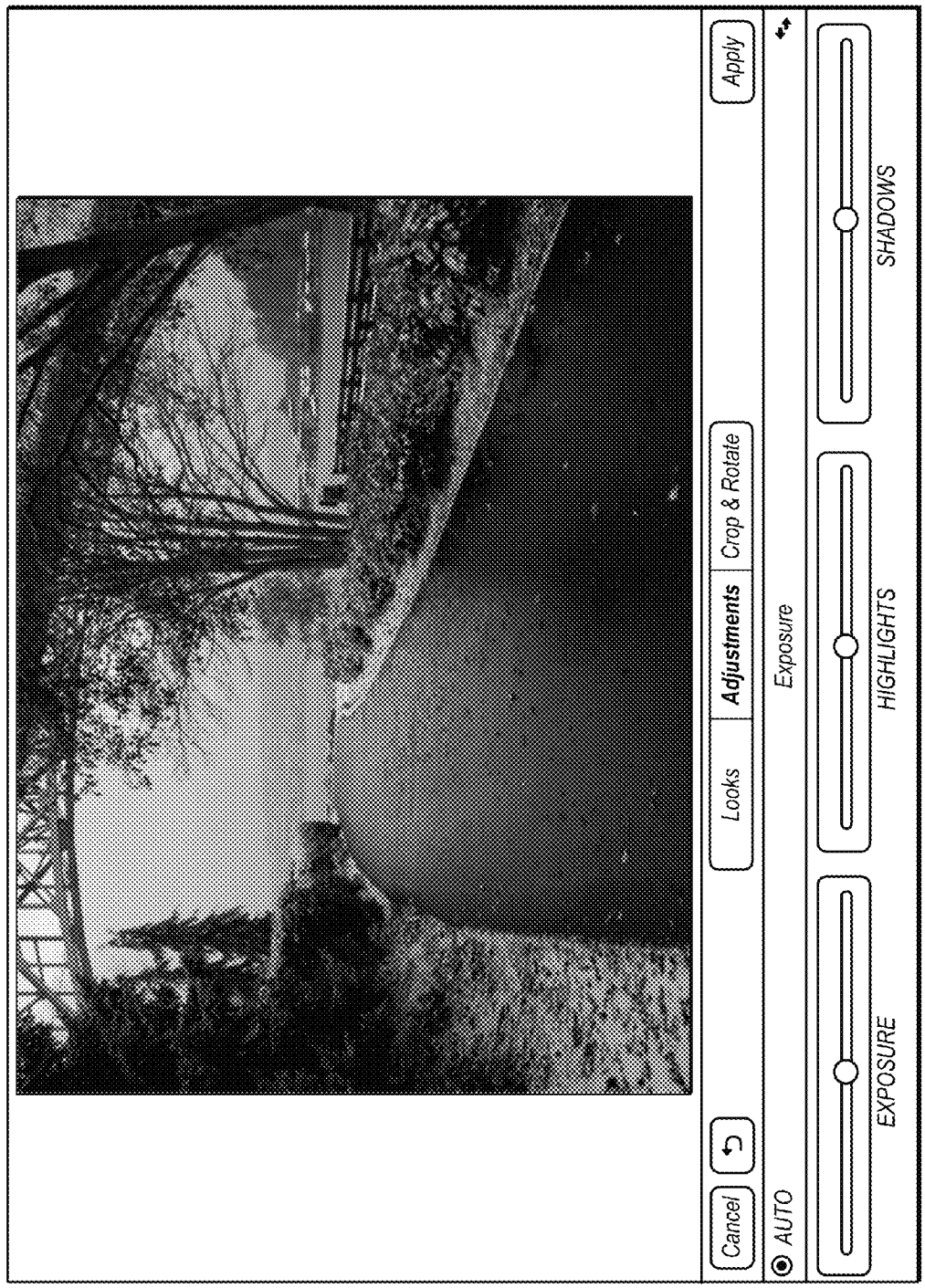
Figure 7D:
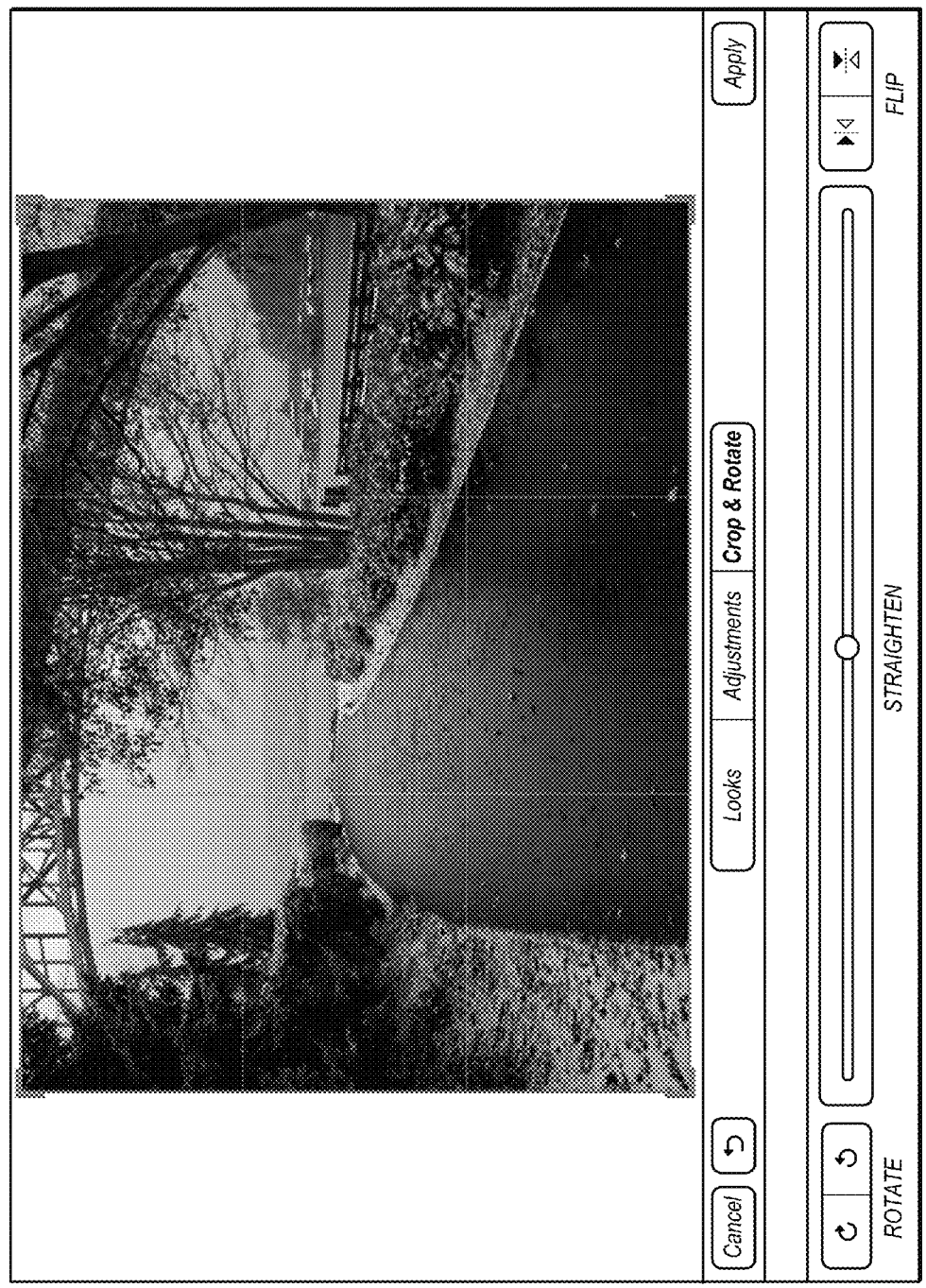

Example inputs that indicate a change regarding the image may be seen in FIGS. 7A-7E. FIG. 7A illustrates a selection of the "Looks" button of the example user interface. Selection of "Looks" presents a variety of look options, including: normal, silvered, dream, sepia, among others. FIG. 7B illustrates a selection of the "Adjustments" button of the example user interface. Selection of "Adjustments" may cause additional selection options to appear that allow a user of the interface to adjust sliders for white balance, exposure, and contrast. An automatic adjust button may also be included in the interface. FIG. 7C illustrates that selection of "Exposure" from FIG. 7B may present further options such as exposure, highlights, and shadows. FIG. 7D illustrates selection of a crop and rotate feature, along with further possible selections. Each of FIGS. 7A-7D includes an "apply" button, which may allow a user to view the changes. In other embodiments, adjusting a slider or clicking auto may automatically cause the display to update to reflect the changes. The examples in FIGS. 7A-7D also show a back button, and a cancel button to allow edits to be canceled and to exit the editing mode.

Figure 7E:
Figure 8A:
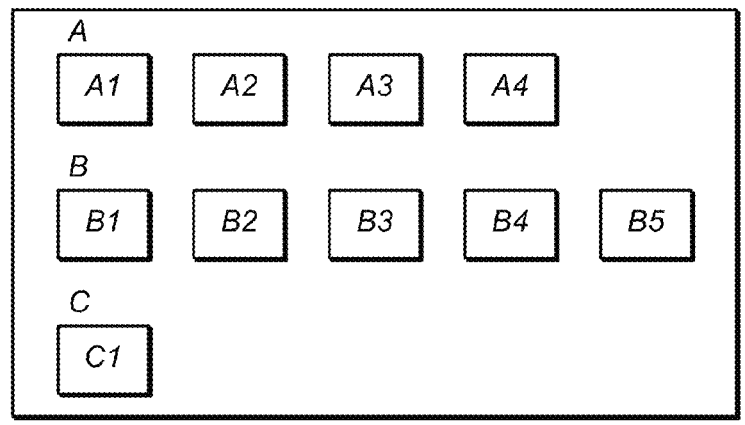
FIGS. 8A-8C illustrate various examples of an interface for browsing content, according to some embodiments.
Figure 8B:
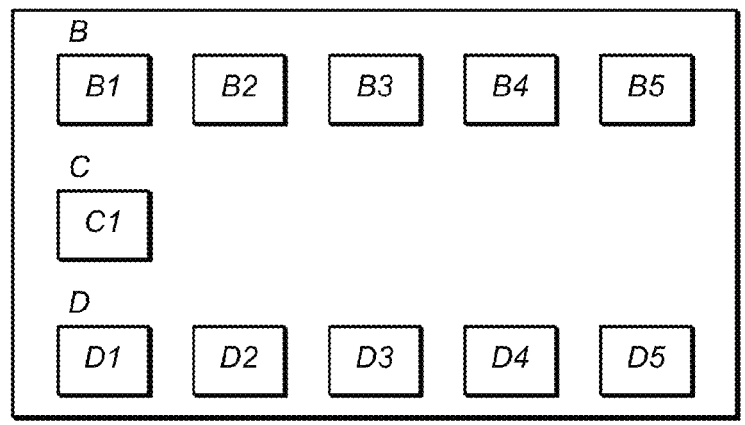
Figure 8C:
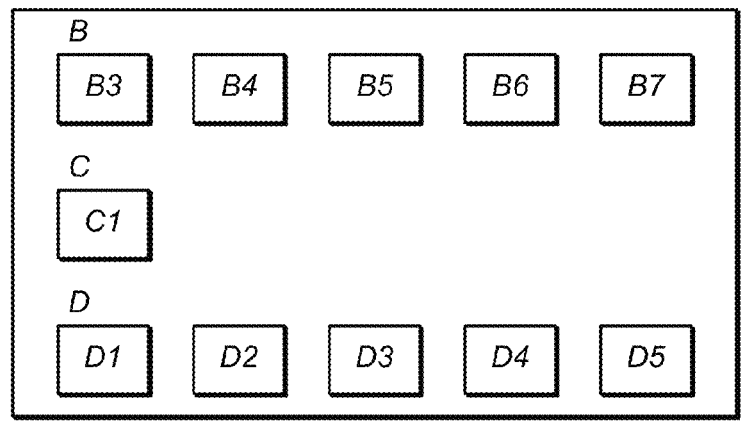

As shown at 404, the node may receive another input, via the interface, to finalize the change. FIG. 7E illustrates an example of such an input. A "Develop" button may be presented which allows a user to finalize the change. The button may be presented, for example, where a user has made edits, and has exited from the editing mode of FIGS. 7A-7D.

At 406, in response to the other input, the node may generate a rendition that reflects the change applied to the image without replacing the original version of the image. In applying the change without replacing the original version of the image, the edit may be referred to as non-destructive. The rendition may include a thumbnail and a rendered preview of an adjusted version of the image based on the change. Each of the thumbnail and the rendered preview may be a lower resolution than the original image. In other embodiments, another node (e.g., a coordinating node or node storing the original image) may generate the rendition.

In various embodiments, the node may transmit textual data corresponding to the change to another node of the plurality of nodes. The textual data may be metadata or other data. The textual data may be transmitted alone to the other node. Or, in one embodiment, the rendition that includes the thumbnail and rendered preview may also be transmitted to the other node. The other node may be configured to store the textual data and the rendition. In some embodiments, the other node may be configured to receive other textual data corresponding to other changes and/or another rendition received from a node other than the node. For instance, the other node may be a coordinating node (e.g., node 116), the node (e.g., node 102), or proxy node 126. The other node may be configured to receive textual data and/or renditions from a variety of different nodes. The textual data and renditions from various nodes may relate to the same image. For example, a user of node 102 and a user of node 106 may each edit the same image, during an overlapping or non-overlapping time period. Each of node 102 and node 106 may perform blocks 402, 404, and 406 and may transmit corresponding textual data and/or a rendition, each relating to the same image.

In one embodiment, the node may receive an indication that a different rendition (or multiple different renditions) of the image that reflects a different change was created by a different node and is currently stored in a data store. An example scenario of when this may occur is the aforementioned overlapping editing of the same image by the node and a different node. Users of nodes 102 and 106 may choose to edit the same image at the same time. The user of node 106 may finish editing the image and finalize the changes, resulting in textual information being transmitted to the coordinating node. The coordinating node may then transmit an indication that a different rendition of the image that reflects the change made by node 106 is available. That indication may be received by node 102. The node receiving that indication may then receive a selection to the interface indicating which rendition to keep. Such a selection may be received at the time node 102 receives the other input to finalize its change. The selection may indicate to keep the rendition from the different node, keep both (or multiple ones of the) renditions, or to only keep the rendition from the node (and delete/replace the rendition(s) from the different node(s)). A selection to keep the rendition from the node may include transmitting the textual data and rendition to the other node.

Note that multiple changes may be received at 402 before the changes are finalized at 404. In such a case, the multiple changes (e.g., changes to white balance and contrast, etc.) may be transmitted as a single revision (e.g., a single rendition and textual information that includes the multiple changes). In one embodiment, the multiple changes may come from more than one device. For instance, a user may begin making edits on a tablet device (e.g., node 102) and finish making edits on their laptop (e.g., node 106). In such an example, the first set of changes made on the tablet device may be transmitted directly to the laptop without sending them through the coordinating node. In other embodiments, the first set of changes may be made available to the laptop via the coordinating node. Instead of a finalize input, a user may choose a save changes option or similar option such that the in-progress edits may be continued from another node.

Figure 5:
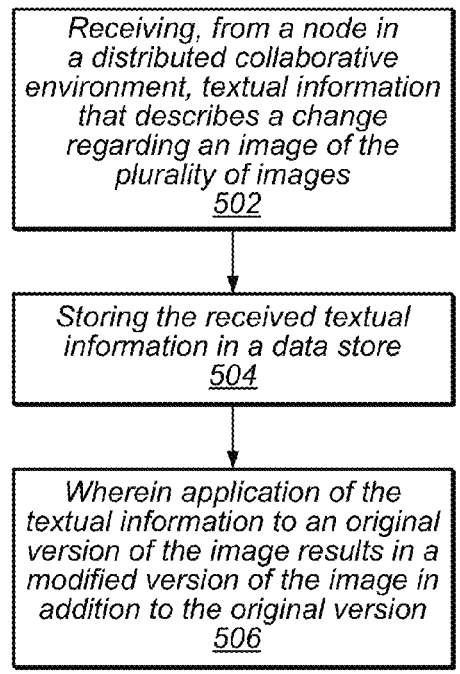

Turning now to FIG. 5, another embodiment of non-destructive content editing is illustrated. While the blocks are shown in a particular order for ease of understanding, other orders may be used. In some embodiments, the method of FIG. 5 may include additional (or fewer) blocks than shown. Blocks 502-506 may be performed automatically or may receive user input. The method of FIG. 5 may be used in conjunction with the methods of FIGS. 2, 3, 4, and/or 6. Accordingly, a combination of some or all of the blocks of FIGS. 2, 3, 4, and/or 6 may be used in some embodiments. In one embodiment, a coordinating node, such as node 116 of FIG. 1, may perform the method of FIG. 5.

As illustrated at 502, textual information that describes a change regarding an image of a plurality of images may be received from a node in a distributed collaborative environment (e.g., the content-aware mesh of FIG. 1). The textual information may describe a change regarding an image of a plurality of images. As described at block 402, changes may include adding a tag to an image (e.g., outdoor scene, beach, etc.) and/or may include substantive edits, such as contrast, white balance, exposure, etc. The textual information may also be referred to herein as collections of settings or adjustment parameters.

As shown at 504, the received textual information may be stored in a data store. The data store may be a database, such as one or more of binary storage 124 and/or database storage 132. Other information may be stored in the same data store. For instance, as described herein, a mapping of content distributed among various nodes may be stored in the data store. The received textual information may correspond to a given image of the plurality of images. Other received textual information and/or other rendition(s) may also exist in the data store. For instance, the other textual information and/or rendition(s) may correspond to other images of the plurality of images, or may correspond to other edits to the same image. Those other edits to the same image may have been received from any one or more of the nodes. An editor using node 102 may make a number of different edits to the same image and upload the textual information corresponding to each edit. One edit may correspond to a black and white version, another edit to a sepia version, and another edit to a cropped version. In other examples, various edits may come from different nodes. For example, different family members who are members of the mesh may practice different editing principles and may have different ideas of how to properly edit a photo. Accordingly, each family member may submit a different edit via their respective node.

In one embodiment, receiving textual information corresponding to an image for which textual information is already stored (e.g., the image has previously been edited) may cause the coordinating node to send an indication to the node indicating that other textual information exists. As described at FIG. 4, the node may select one or more renditions and/or textual information to keep in the data store. Accordingly, the coordinating node may receive a selection to keep one or multiple ones of the renditions and/or textual information. If the selection is to replace a previously stored rendition and/or textual information, the storing of block 504 may include replacing the previously stored textual information. If the selection is to keep one or more previously stored renditions and/or textual information, then storing may include storing the new rendition and/or textual information in addition to the already stored rendition(s)/textual information. Storing multiple edits may include appending metadata from multiple pieces of textual information into a single new piece of textual metadata or storing multiple edits may include separately storing the textual information in the data store.

At 506, application of the textual information to an original version of the image may result in a modified version of the image in addition to the original version. In this manner, editing may be non-destructive in that the original version is maintained. Application of the textual information may be provided by the node, the coordinating node, and/or a different node. Examples of the scenarios follow. As described herein, whichever node applies the textual information may do it such that the edits are non-destructive.

In one embodiment, the received textual information may be provided to another node. The other node may be configured to apply the textual information to the original version of the image resulting in a modified version of the image in addition to the original version. As one example, coordinating node 116 may receive textual information corresponding to a change to an image from node 102. Coordinating node 116 may then provide the textual information to node 106 to apply the textual information to the original version. Note that in this example, node 106 may store the original version of the image that was edited by node 102.

In some embodiments, in addition to receiving textual information from the node, the modified version of the image, in the form of a rendition, may also be received from the node. In such embodiments, the node that generated the textual information may also generate the rendition that includes the modified version and/or a thumbnail. The modified version may be a low-resolution version (e.g., less than full resolution, less than the resolution of the original version) of the image. The rendition may be stored. Other nodes may have access to view such renditions so that they may not have to perform their own image processing to view what the modified looks like.

Each other node/client may be made aware, by the coordinating node, of the presence of new renditions and/or textual information. This may be done at the time the new rendition and/or textual information is received or periodically or upon some other event (e.g., query by a node, a node entering an edit mode for a particular image, etc.).

The stored textual information may be a linear list of changes that have been made. Such stored information may be accessible by various nodes such that a node may view available renditions and/or a list of metadata/collection of settings. The metadata and/or collection of settings may be translated into human understandable information descriptive of the changes.

In some instances, a change may not result in a newly generated preview or rendition. For example, a user of a node may tag a photo, which may not visually affect the image. In such an example, the textual information may simply be the new tag, which may be uploaded by a node and received by the coordinating node. Because a new rendition and thumbnail may not be generated if the image is not visually affected, the node may not transmit and the coordinating node may not receive a rendition and thumbnail with such a change.

In one embodiment, the coordinating node may receive the textual information and also have access to the original version of the image. Accordingly, the coordinating node may apply the textual information to the original version resulting in the modified version.

The disclosed non-destructive editing techniques of FIGS. 4-5 may permit multiple users to exchange multiple versions of edits in a collaborative fashion. Additionally, using lower-resolution renditions allows clients to display the edits without needing to re-render them locally and results in less required storage space. Moreover, the disclosed conflict resolution allows multiple access at the same time and provides a manner to resolve conflicts.

Figure 6:
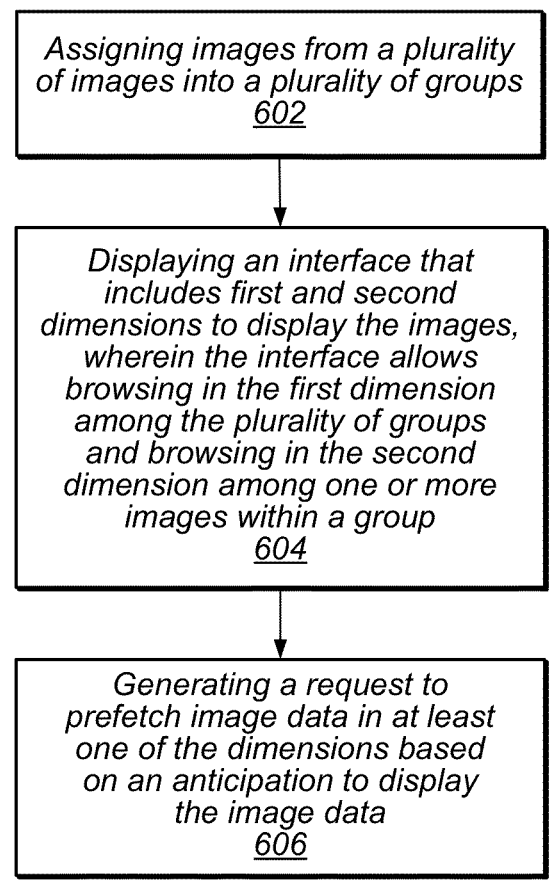
FIG. 6 is a flowchart that illustrates a method for browsing content, according to some embodiments.

Turning now to FIG. 6, one embodiment of browsing content is illustrated. While the blocks are shown in a particular order for ease of understanding, other orders may be used. In some embodiments, the method of FIG. 6 may include additional (or fewer) blocks than shown. Blocks 602-606 may be performed automatically or may receive user input. The method of FIG. 6 may be used in conjunction with the methods of FIGS. 2-5. Accordingly, a combination of some or all of the blocks of FIGS. 2-5 may be used in some embodiments. In one embodiment, a node, such as node 102 of FIG. 1, may perform the method of FIG. 6

As illustrated at 602, images from a plurality of images may be assigned into a plurality of groups, or collections. Each of the groups may include at least one of the images. The groups may be defined by a tag such that each respective image belonging to that group includes the same tag. Note that images may include multiple tags but may be grouped according to a common tag with other images of the same group. In one embodiment, a tag may include a date (e.g., date the photo was taken, date the photo was downloaded to the node, etc.). The date may reside in the image's metadata. The granularity of a group by date may vary. For example, a group may be defined by a year, a month, or a date the image was taken, among others. Tags may be a key word, such as outdoor scene, 40th birthday party, etc. Tagging may be by status, such as which photos have been uploaded to an external service. Tagging may be automatically performed (e.g., by database query) or may be user specified (e.g., defined by a user as being from an event, like a wedding, birthday party, etc.). In one embodiment, tagging may initially be automatically performed but may be refined manually. Renditions may be assigned to the same group as the corresponding original image.

Within each group, the images may be partitioned into a sequence. For example, the images may be ordered by timestamp of the images. The timestamp may be the time the image was taken or the time the image was last edited. Or, images may be ordered in a different manner, such as by file size or name.

As shown at 604, an interface that includes first and second dimensions may be displayed. Various examples are shown in FIGS. 8A-8C and FIGS. 9A-9H. The interface may allow browsing in the first dimension among the plurality of groups. The interface may also allow browsing in the second dimension among one or more images within a group. As one example of an interface with two-dimensions (e.g., vertical and horizontal), groups may be scrolled vertically and within each group, images may be scrolled horizontally. Browsing or scrolling may be accomplished by various inputs (e.g., mouse pointer, gestures, such as touch gestures, etc.). Note that an interface may include three dimensions and have browsing ability in each of the three dimensions (e.g., x, y, and z).

In one embodiment, the interface may display as many images (e.g. thumbnails) that may be fit on the display. The thumbnails may include be fixed width, or in some embodiments, may be variable width. For a variable width thumbnail implementation, a layout may be created beforehand using the aspect ratios of the images. In contrast to an implementation in which an entire set of images are downloaded, in one embodiment, the images that are visible on the display for the group or groups may be the ones that are downloaded. Other images may later be prefetched and fetched as needed, as described herein. This may allow large amounts of data (as can be the case with image and/or video content) to be efficiently handled by not having to populate it all at once.

At 606, a request to prefetch image data in at least one of the dimensions may be generated. Generation of the request to prefetch data may be based on an anticipation to display the image data. Anticipation to display the image data may be based on a number of factors, such as the speed and/or direction of browsing, and/or the use of variable width thumbnails. As an example, if a user is slowly browsing images of one of the groups from left to right on the display and uses a gesture to bring in images to the display screen from off the right side of the screen, images that are next in the sequence from off-screen-right may be prefetched. If a user is rapidly swiping from right to left to move much farther into the images of that group, the immediately next images in the sequence may not be prefetched based on the speed of the browsing. Instead, those images may be skipped and image data corresponding to images later in the sequence may be prefetched.

In some embodiments, to generate the prefetch requests, the node may know the full list of groups and associated images. The node may calculate the full list, for example by fetching the information over the web, or by calculating it by using a database query. Based on which tracks are visible on the screen, those images may be fetched. A default view may exist such that starting images are already fetched and ready to display. One example default view may be the topmost group(s) and leftmost image(s) of those group(s).

In one embodiment, some amount of overscan may be performed such that image data for nearby images are prefetched in one or more of the dimensions to allow a user of the interface to scroll in any direction and readily have those nearby images available. If the interface is not actively being manipulated to scroll in any direction, prefetches may occur in each direction because it may not be known which direction is most likely to be displayed next. If the interface is actively being scrolled vertically, then most or all of the prefetching may be done in the vertical dimension in the same direction of scroll (e.g., up or down). Similarly, if the interface is actively being scrolled horizontally, then most or all of the prefetching may be done in the horizontal dimension in the same direction of scroll (e.g., left or right). As noted above, if the interface is being scrolled rapidly, then nearby image data may not need to be prefetched and instead, the prefetch requests may be generated for image data corresponding to images farther away in the sequence.

In various embodiments, the request to prefetch image data may be executed and the image data may be prefetched. The display may then be updated with the prefetched image data. Note that according to the prefetch parameters, the prefetch may be completed before the data is needed for display. As a result, the display may be updated later and not necessarily immediately upon prefetching the data. For instance, assume a display of a node allows 3 rows of 5 images to be displayed at one time. Let the middle row be the row being scrolled and prefetched. The middle row may include thousands of images. If the middle row is being scrolled in a given dimension, the number and which images to be prefetched may vary based on the rate of scroll. Note that the requests to prefetch may be individual requests for each image such that the prefetches, each corresponding to a given image, may be offset by some time delta. But to keep the explanation simple, assume in a simple example that the next five images in the sequence after the five currently displayed in the middle row may be prefetched at a time t. Only two of the images may be needed to display at time t+1, whereas the remaining three prefetched images may not be needed to display at time t+2. Accordingly, the three other prefetched images may be held in the node's local memory ready to display at time t+2 (or whenever the display is in fact scrolled to where those images would be needed). In one embodiment, multiple fetches may be executed simultaneously and asynchronously.

In one embodiment, the request to prefetch image data may be canceled. Canceling the request to prefetch image data may be based on a determination that prefetching the image data has not been initiated and that displaying the image data is no longer anticipated. One example scenario in which the request may be canceled includes a user scrolling within a group to view images off to the right of the screen. A user may subsequently stop scrolling and may change direction of the scroll such that that likelihood of displaying the next images in the sequence from the original scroll direction is very low. Note that if the prefetch has already begun, the request to prefetch may not be canceled, even if it is no longer anticipated that the image data will be displayed. In one example implementation, the prefetch requests may be put in a last in, first out (LIFO) manner. In doing so, the cancel mechanism may help ensure that data is not needed is not continually polled. Such a mechanism may enable a more responsive interface, for example, when a user stops the browsing.

In one embodiment, previously prefetched image data may be locally stored. For example, previously prefetched image data may be stored in a cache of the node (e.g., CPU cache, display cache, etc.). Such data may persist in local storage until a maximum capacity or an allowed usage amount (e.g., 80% of available cache space) has been reached or until the local storage is cleared (manual or automatic). A user can manually configure the allowable size of the cache via the interface.

One or more of blocks 602, 604, and 606 may be performed dynamically to account for updates to the plurality of images. For example, the assigning of block 602 may be repeated upon receiving an update to the plurality of images. An example scenario in which this may occur may be adding a new node that includes a number of additional images to the mesh. Those images may then be assigned to existing groups or newly added groups (e.g., if tags of the newly received images warrant creating a new group). Or, all of the images may be regrouped when an update occurs. Another example scenario may be when one of the nodes generates a new rendition (e.g., according the non-destructive editing techniques herein) of an image. Accordingly, the updated version of the image and the original version may coexist such that the plurality of images includes both versions. The updated version may be assigned to the same group as the original version or if the grouping is by date modified (or some other grouping), the newly created updated version may be assigned to a different group.

An image of the plurality of displayed images in the interface may be selected to zoom to full screen mode resulting in a single image being displayed. This may be used to simply zoom in on an image or may be used to enter an editing mode, such as the disclosed non-destructive editing.

FIGS. 9A-9H illustrate various examples of an interface that is usable to browse content, according to some embodiments. The example interfaces may be capable of the multiple-dimension browsing and non-destructive editing techniques described herein. The example interfaces show a variety of landscape and portrait orientations for viewing images.

Figure 9A:
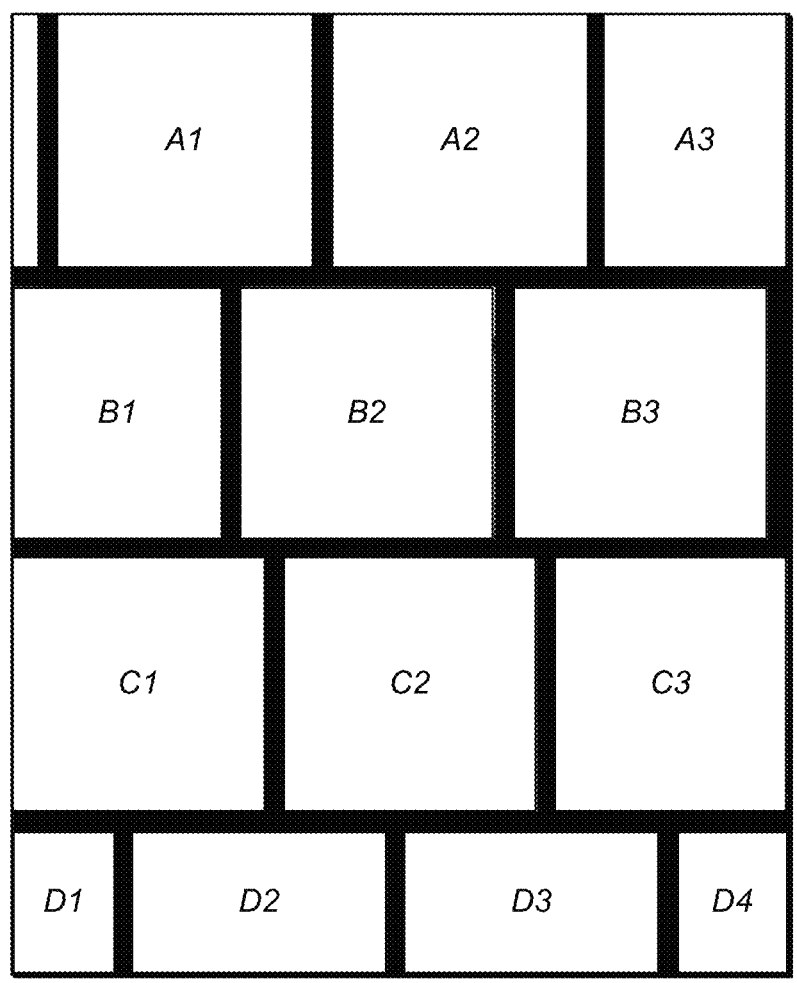
FIGS. 9A-9H illustrate various examples of an interface that is usable to browse content, according to some embodiments.
Figure 9B:
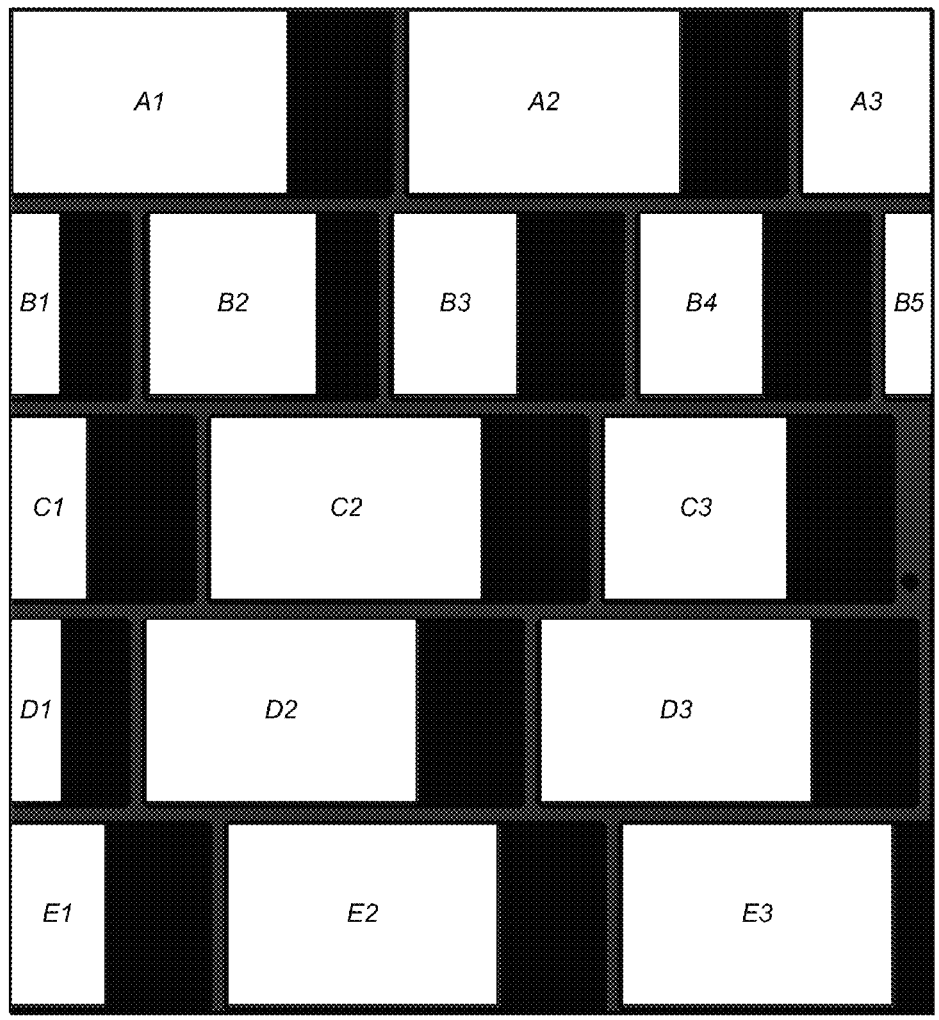
Figure 9C:
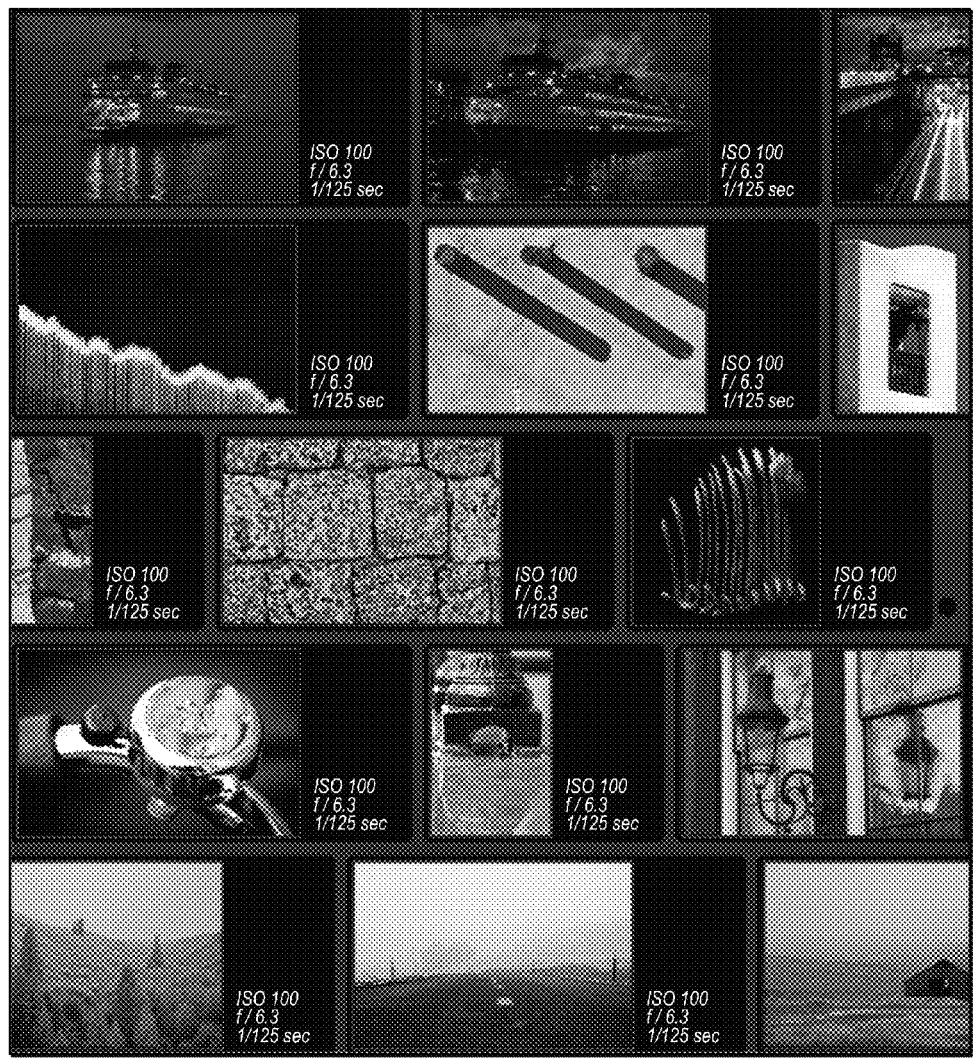
Figure 9D:
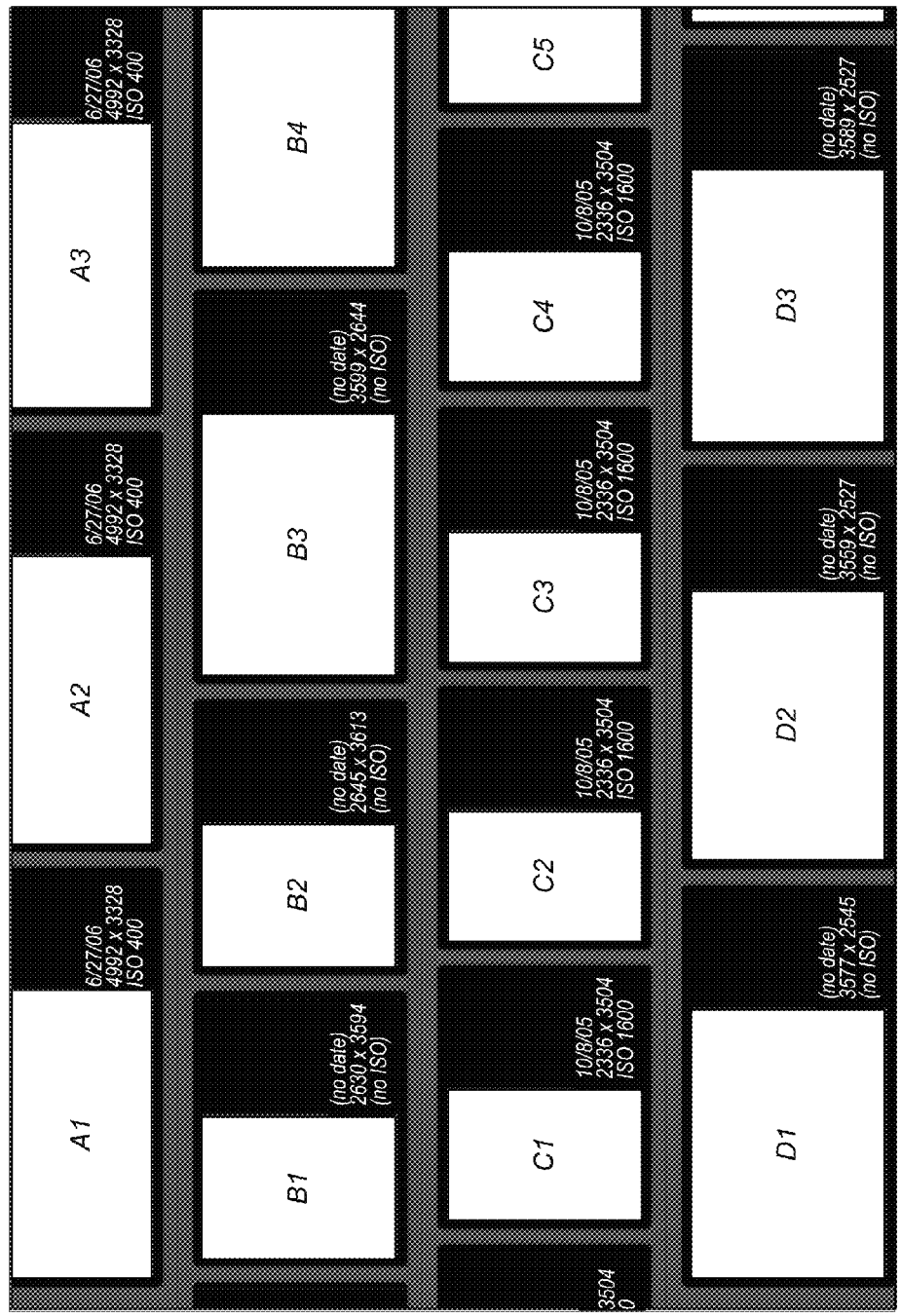
Figure 9E:
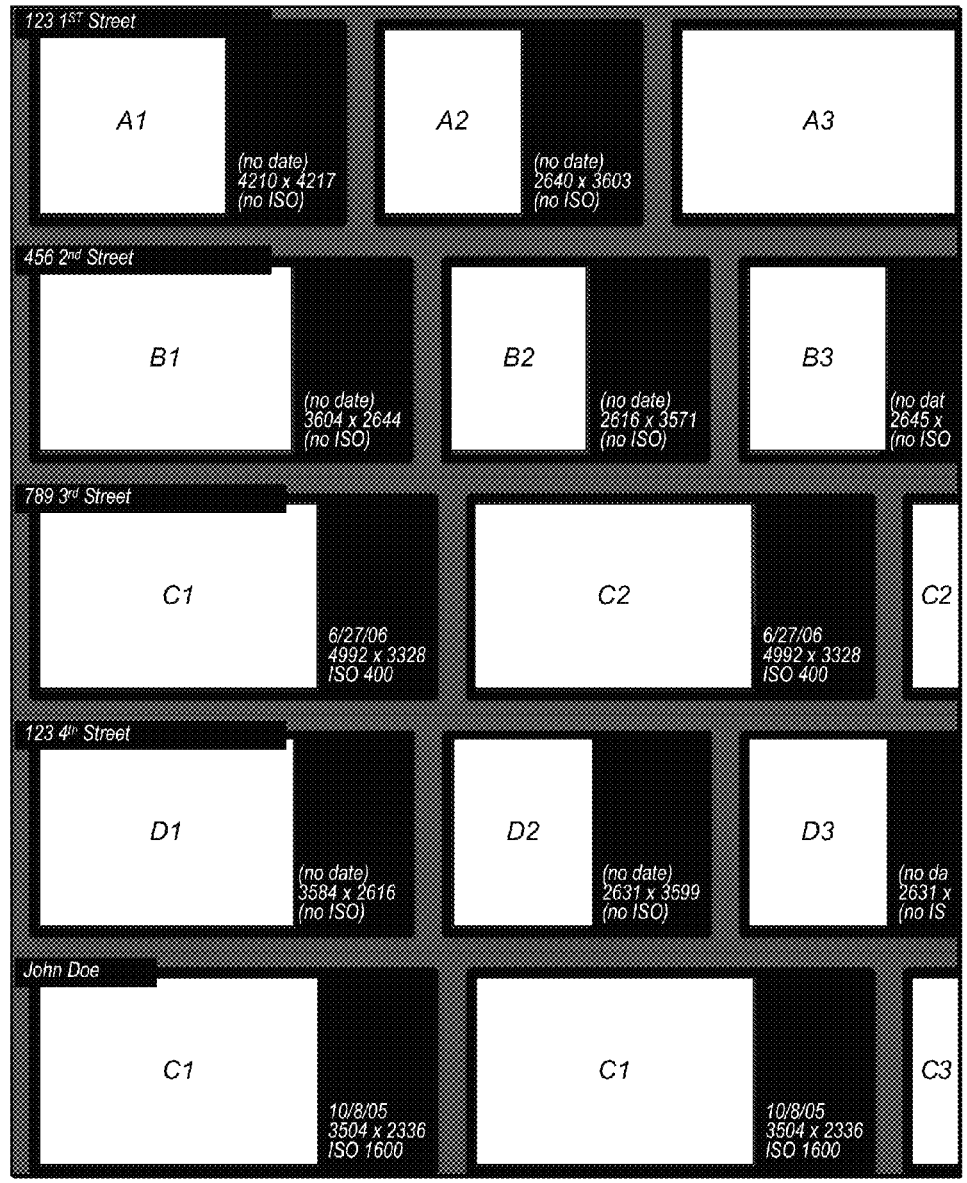
Figure 9F:
Figure 9G:
Figure 9H:

FIG. 9A illustrates an example interface that uses fixed width thumbnails of images. FIG. 9B illustrates an example interface that uses variable width thumbnails. FIGS. 9C-9E illustrate example interfaces implementing variable width thumbnails in which metadata is also displayed. The displayed metadata in those examples includes data, image dimensions (e.g., 4992×3328 pixels, etc.), and shutter speed. In FIG. 9E, the names of groups (e.g., 123 4th Street, John Doe, etc.) are also displayed. FIGS. 9F-9H shows an example interface implementing variable width thumbnails that simply displays group names without showing the above-mentioned metadata of FIGS. 9C-9E. FIG. 9H additionally shows other information such as the total number of photos in a group and an indication of any images marked as favorites within a group.

The disclosed browsing techniques may allow for efficient handling and browsing of large amounts of data, even on nodes/devices with modest hardware, such as mobile devices (e.g., tablets, phones, laptops). By performing asynchronous prefetching, fetching, and fetch canceling, perceived performance of the interface may be very smooth.

While examples of the methods of FIG. 4-6 may include implementations using the described content-aware mesh, the methods of FIG. 4-6 may also be implemented in a typical client-server arrangement or other arrangements (e.g., non-cloud-based). In a client-server arrangement, node 116 may be a server configured to centrally store all of the plurality of images instead of having the images distributed among the various nodes. Even in such an arrangement, the non-destructive editing of FIGS. 4-5 may still take place in a collaborative manner. Moreover, the browsing techniques of FIG. 6 may be used in a client-server embodiment, or in an embodiment with a single node. For example, the disclosed browsing techniques, including the prefetch mechanism, may be implemented by a single node to browse the images on that node.

It will be appreciated that the methods of FIGS. 2-6 are example embodiments of methods employed according to the techniques described herein. The methods of FIGS. 2-6 may be modified to facilitate variations of its implementations and uses. For example, although some embodiments have been described with respect to images, the techniques may be applied for use with similar content. The methods of FIGS. 2-6 may be implemented in software, hardware, or a combination thereof.

Program instructions and/or data for implementing embodiments of data collection code and/or matching code as described herein may, for example, be stored on a computer-readable storage medium. A computer-readable storage medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc.

Exemplary Computer System

Figure 10:
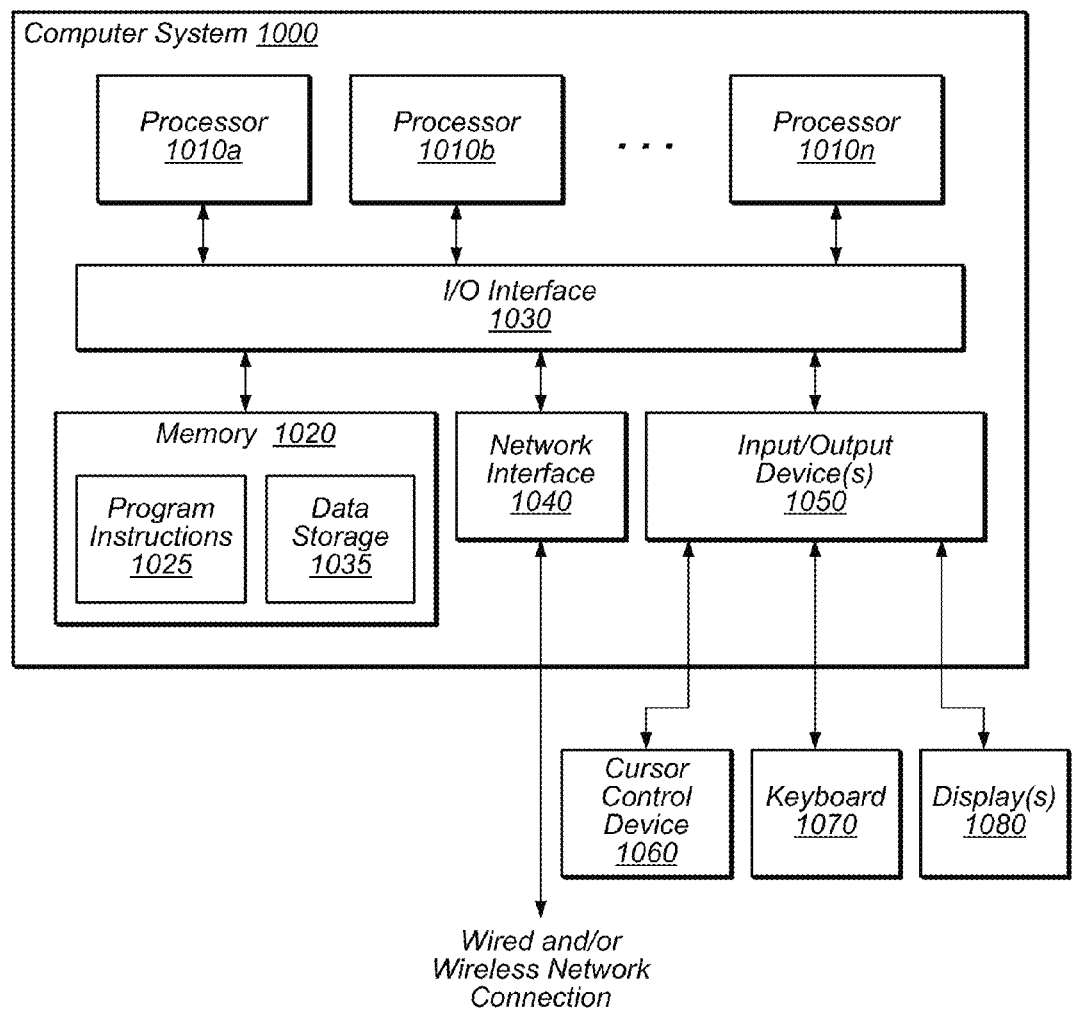
FIG. 10 illustrates an example computer system that may be used in accordance with one or more embodiments.

Various portions of a content-aware mesh, non-destructive editing techniques, and/or the disclosed browsing techniques may be executed on one or more computer systems, which may interact with various other devices. One such computer system is illustrated by FIG. 10. For example, nodes 102, 106, and/or 110, application store 114, IMS 134, node 116, proxy node 126, and/or external services 128 may each include, employ or be executed on one or more computer systems.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system 1000, while in other embodiments multiple such systems, or multiple components making up computer system 1000, may be configured to host different portions or instances of embodiments. For example, in one embodiment some elements may be implemented via one or more components of computer system 1000 that are distinct from those components implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for layout-preserved text generation may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a layout-preserved text generation method, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network (e.g., network 108), such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Memory 1020 may include program instructions 1025, configured to implement embodiments as described herein, and data storage 1035, comprising various data accessible by program instructions 1025. In one embodiment, program instructions 1025 may include software elements of one or more methods illustrated in the above Figures. Data storage 1035 may include data that may be used in embodiments. In other embodiments, other or different software elements and/or data may be included.

Those skilled in the art will appreciate that computer system 1000 is merely illustrative and is not intended to limit the scope of analytics data collection or analytics data matching methods as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the disclosed embodiments may be practiced with other computer system configurations. In some embodiments, portions of the techniques described herein may be hosted in a cloud computing infrastructure.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the embodiments embrace all such modifications and changes and, accordingly, the above description to be regarded in an illustrative rather than a restrictive sense.

What is claimed is:

1. A method, comprising:
   assigning images into a plurality of groups in which each group includes at least one of the images;
   displaying an interface that includes first and second dimensions in a same window to display the images, the interface configured to allow browsing in the first dimension among the plurality of groups and also allow browsing in the second dimension among one or more images of one of the groups such that during the browsing in the second dimension, one or more images of another one of the groups remain displayed in the same window;
   generating a request to prefetch image data of non-displayed images for the first dimension responsive to a determination that the interface is actively being manipulated to browse in the first dimension; and
   generating an additional request to prefetch the image data of the non-displayed images for the second dimension based on a determination that a speed of the browsing in the first dimension does not exceed a threshold.

2. The method of claim 1, further comprising locally storing previously prefetched image data.

3. The method of claim 1, further comprising prefetching the image data and updating said displaying with the prefetched image data.

4. The method of claim 1, wherein the images are displayed as variable width thumbnails.

5. The method of claim 1, further comprising:
   receiving an update to the images; and
   updating said assigning based on the update to the images.

6. The method of claim 5, wherein the update includes an updated version of one image of the images, wherein the updated images includes both the updated version of the one image and an original version of the one image.

7. A non-transitory computer-readable storage medium storing program instructions, the program instructions computer-executable to implement:
   assigning images into a plurality of groups in which each group includes at least one of the images;
   displaying an interface that includes first and second dimensions in a same window to display the images, the interface configured to allow browsing in the first dimension among the plurality of groups and also allow browsing in the second dimension among one or more images of one of the groups such that during browsing in the second dimension, one or more images of another one of the groups remain displayed in the same window; and
   generating a request to prefetch image data of non-displayed images for the first dimension responsive to a determination that the interface is actively being manipulated to browse in the first dimension; and
   generating an additional request to prefetch the image data of the non-displayed images for the second dimension based on a determination that a speed of the browsing in the first dimension does not exceed a threshold.

8. The non-transitory computer-readable storage medium of claim 7, further comprising:
   generating a request to prefetch the image data of the non-displayed mages in at least one of the first or second dimensions based on an anticipation to display the image data, wherein the program instructions are further computer-executable to implement locally storing previously prefetched image data.

9. The non-transitory computer-readable storage medium of claim 7, wherein the program instructions are further computer-executable to implement prefetching the image data and updating said displaying with the prefetched image data.

10. The non-transitory computer-readable storage medium of claim 7, wherein the program instructions are further computer-executable to implement:
    receiving an update to the images; and
    updating said assigning based on the update to the images.

11. A system, comprising:
    at least one processor; and
    a memory comprising program instructions that are executable by the at least one processor to:
    assign images into a plurality of groups in which each group includes at least one of the images;
    display an interface that includes first and second dimensions in a same window to display the images, the interface configured to allow browsing in the first dimension among the plurality of groups and also allow browsing in the second dimension among one or more images of one of the groups such that during browsing in the second dimension, one or more images of another one of the groups remain displayed in the same window;
    generate a request to prefetch image data of non-displayed images for the first dimension responsive to a determination that the interface is actively being manipulated to browse in either the first dimension; and
    generate an additional request to prefetch the image data of the non-displayed images for the second dimension based on a determination that a speed of the browsing in the first dimension does not exceed a threshold.

12. The system of claim 11, wherein the program instructions are further executable by the at least one processor to locally store previously prefetched image data.

13. The method of claim 1, further comprising:
    determining that the interface is not actively being manipulated to browse in either the first or second dimension after a previous manipulation of the interface to browse the images;

generating another request to prefetch the image data of non-displayed images for both the first and second dimensions responsive to said determining that the interface is not actively being manipulated to browse in either the first or second dimension.

14. The method of claim 1, further comprising:
canceling the request to prefetch the image data based on a determination that prefetching the image data has not been initiated and that displaying the image data is no longer anticipated.

15. The non-transitory computer-readable storage medium of claim 7, wherein responsive to the determination that the interface is not actively being manipulated includes a determination that intended browser direction is not known in either the first or second dimensions.

16. The non-transitory computer-readable storage medium of claim 7, further comprising:
canceling the request to prefetch the image data based on a determination that prefetching the image data has not been initiated and that displaying the image data is no longer anticipated.

17. The system of claim 11, wherein the program instructions are further executable by the at least one processor to cancel the request to prefetch the image data based on a determination that prefetching the image data has not been initiated and that displaying the image data is no longer anticipated.

18. The method of claim 1, further comprising:
responsive to the determination that the speed of the browsing in the first dimension exceeds the threshold, canceling said generating the additional request to prefetch the image data of the non-displayed images for the second dimension.

19. The method of claim 1, further comprising:
generating another request to prefetch the image data of the non-displayed images in at least one of the first or second dimensions, the other request including a time offset based on the speed of the browsing, the time offset indicating a time when the image data is needed to display the images in the interface.

20. The non-transitory computer-readable storage medium of claim 7, further comprising:
generating another request to prefetch the image data of the non-displayed images in at least one of the first or second dimensions, the other additional request including a time offset based on the speed of the browsing, the time offset indicating a time when the image data is needed to display the images in the interface.

* * * * *

UNITED STATES PATENT AND TRADEMARK OFFICE
CERTIFICATE OF CORRECTION

PATENT NO. : 9,514,157 B2  
APPLICATION NO. : 13/592115  
DATED : December 6, 2016  
INVENTOR(S) : Hamburg et al.

Page 1 of 1

It is certified that error appears in the above-identified patent and that said Letters Patent is hereby corrected as shown below:

In the Claims

Column 22, Line 55, after "to browse in" delete "either"

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*